US012057074B2

(12) United States Patent
Nam

(10) Patent No.: US 12,057,074 B2
(45) Date of Patent: Aug. 6, 2024

(54) DISPLAY DEVICE AND METHOD OF DRIVING THE SAME

(71) Applicant: Samsung Display Co., LTD., Yongin-si (KR)

(72) Inventor: Yang Uk Nam, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/372,333

(22) Filed: Sep. 25, 2023

(65) Prior Publication Data

US 2024/0203346 A1 Jun. 20, 2024

(30) Foreign Application Priority Data

Dec. 14, 2022 (KR) ........................ 10-2022-0175118

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0247* (2013.01); *G09G 2330/021* (2013.01); *G09G 2330/028* (2013.01)

(58) Field of Classification Search
CPC ......... G09G 3/3233; G09G 2300/0819; G09G 2300/0842; G09G 2310/08; G09G 2320/0247; G09G 2330/021; G09G 2330/028
See application file for complete search history.

(56) References Cited

U.S. PATENT DOCUMENTS

| | | | | |
|---|---|---|---|---|
| 9,064,456 B2 * | 6/2015 | Seo | G09G 3/3233 |
| 9,685,111 B2 * | 6/2017 | Choi | G09G 3/3233 |
| 9,966,009 B2 * | 5/2018 | Numata | G09G 3/3258 |
| 11,393,395 B2 * | 7/2022 | Kim | G09G 3/3233 |
| 2013/0235016 A1 * | 9/2013 | Seo | G09G 3/3208 345/212 |
| 2020/0279514 A1 * | 9/2020 | Lee | B60R 1/00 |

FOREIGN PATENT DOCUMENTS

| | | | |
|---|---|---|---|
| JP | 6568755 B2 | 8/2019 |
| KR | 102016153 B1 | 8/2019 |

* cited by examiner

*Primary Examiner* — Jonathan A Boyd
(74) *Attorney, Agent, or Firm* — CANTOR COLBURN LLP

(57) ABSTRACT

A display device includes: pixels, each of which is connected to a first power line and a second power line; and a power supply which, in a first display mode, supplies a first power voltage to the first power line and supplies a second power voltage to the second power line. The power supply includes: a first power supply which generates the first power voltage; a second power supply which generates the second power voltage; and a shut-down determiner which shuts down the first power supply and the second power supply in a case where the first power voltage is greater than a first reference voltage at a first time point, and the second power voltage is greater than a second reference voltage at a second time point.

20 Claims, 11 Drawing Sheets

DISPLAY DEVICE AND METHOD OF DRIVING THE SAME

This application claims priority to Korean Patent Application No. 10-2022-0175118, filed on Dec. 14, 2022, and all the benefits accruing therefrom under 35 U.S.C. § 119, the content of which in its entirety is herein incorporated by reference.

BACKGROUND

1. Field

Various embodiments of the disclosure relate to a display device and a method of driving the display device.

2. Description of Related Art

With the development of information technology, the importance of a display device, which is a connection medium between a user and information, has been emphasized. Accordingly, various kinds of display devices, such as a liquid crystal display device and an organic light-emitting display device, are widely used in various fields.

The display devices may display images using a combination of lights emitted from a plurality of pixels. The display devices may include a power supply for providing a power voltage to be supplied to the plurality of pixels.

SUMMARY

Before the power supply provides a power voltage to the pixels, a short-circuit test may be performed. If the first power line and the second power line are short-circuited by a crack formed in some of the pixels, an accident such as a fire may occur when the power voltage is supplied to the pixels.

However, if the short-circuit test is frequently performed under conditions in which the short-circuit test is not desired, an abnormal luminance image may be visible to a user, so that the display quality may be reduced.

Various embodiments of the disclosure are directed to a display device which includes various display modes distinguished from each other so that a short-circuit test can be prevented from being performed in undesired cases, and to a method of driving the display device.

Various embodiments of the disclosure are directed to a display device in which even if the magnitude of a first power voltage is relatively small, a short-circuit testing function can be reliably performed, and to a method of driving the display device.

An embodiment of the disclosure provides a display device including: pixels, each of which is connected to a first power line and a second power line; and a power supply which, in a first display mode, supplies a first power voltage to the first power line and supplies a second power voltage to the second power line. In such an embodiment, the power supply includes: a first power supply which generates the first power voltage; a second power supply which generates the second power voltage; and a shut-down determiner which shuts down the first power supply and the second power supply in a case where the first power voltage is greater than a first reference voltage at a first time point, and the second power voltage is greater than a second reference voltage at a second time point.

In an embodiment, the second time point may be after the first time point, and an interval between the first time point and the second time point may be shorter than one frame period.

In an embodiment, the second reference voltage may be greater than the first reference voltage.

In an embodiment, the first reference voltage may be less than a ground voltage, and the second reference voltage may be greater than the ground voltage.

In an embodiment, the display device may further include a data driver which, in a second display mode, supplies the first power voltage to the first power line and supplies the second power voltage to the second power line. In such an embodiment, the second power voltage in the second display mode may be greater than the second power voltage in the first display mode.

In an embodiment, the power supply may include: a discharge transistor connected to the second power line; and a discharge resistor connected to the discharge transistor.

In an embodiment, the power supply may further include: a first comparator including a first input terminal connected to the second power line, and a second input terminal which receives the first reference voltage; a first gate including a first input terminal connected to an output terminal of the first comparator, and a second input terminal; and a second gate including a first input terminal which receives a short-circuit detection setting signal, and a second input terminal connected to the output terminal of the first gate.

In an embodiment, the first gate may be an OR gate, and the second gate may be an AND gate.

In an embodiment, the power supply may further include: a calculator which computes the second reference voltage based on a first power voltage setting value; and a second comparator including a first input terminal connected to the second power line, and a second input terminal which receives the second reference voltage.

In an embodiment, the shut-down determiner may determine whether to shut down the first power supply and the second power supply, based on an output logic signal of the second gate and an output logic signal of the second comparator.

An embodiment of the disclosure provides a method of driving a display device including: pixels, each of which is connected to a first power line and a second power line; and a power supply which, in a first display mode, supplies a first power voltage to the first power line and supplies a second power voltage to the second power line. In such an embodiment, the method includes: changing a power control signal from a first logic level to a second logic level; detecting a magnitude of the second power voltage; checking whether the second power voltage is greater than a first reference voltage at a first time point; checking whether the second power voltage is greater than a second reference voltage at a second time point after the first time point in a case where the second power voltage is greater than the first reference voltage at the first time point; and shutting down a first power supply and a second power supply of the power supply in a case where the second power voltage is greater than the second reference voltage at the second time point, where the first power supply generates the first power voltage, and the second power supply generates the second power voltage.

In an embodiment, the second time point may be after the first time point, and an interval between the first time point and the second time point may be shorter than one frame period.

In an embodiment, the second reference voltage may be greater than the first reference voltage.

In an embodiment, the first reference voltage may be less than a ground voltage, and the second reference voltage may be greater than the ground voltage.

In an embodiment, the display device may further include a data driver which, in a second display mode, supplies the first power voltage to the first power line and supplies the second power voltage to the second power line. In such an embodiment, the second power voltage in the second display mode may be greater than the second power voltage in the first display mode.

In an embodiment, the power supply may include: a discharge transistor connected to the second power line; and a discharge resistor connected to the discharge transistor.

In an embodiment, the power supply may further include: a first comparator including a first input terminal connected to the second power line, and a second input terminal which receives the first reference voltage; a first gate including a first input terminal connected to an output terminal of the first comparator, and a second input terminal; and a second gate including a first input terminal which receives a short-circuit detection setting signal, and a second input terminal connected to the output terminal of the first gate.

In an embodiment, the first gate may be an OR gate, and the second gate may be an AND gate.

In an embodiment, the power supply may further include: a calculator which computes the second reference voltage based on a first power voltage setting value; and a second comparator including a first input terminal connected to the second power line, and a second input terminal which receives the second reference voltage.

In an embodiment, the power supply may further include a shut-down determiner which determines whether to shut down the first power supply and the second power supply, based on an output logic signal of the second gate and an output logic signal of the second comparator.

DETAILED DESCRIPTION

Figure 1:
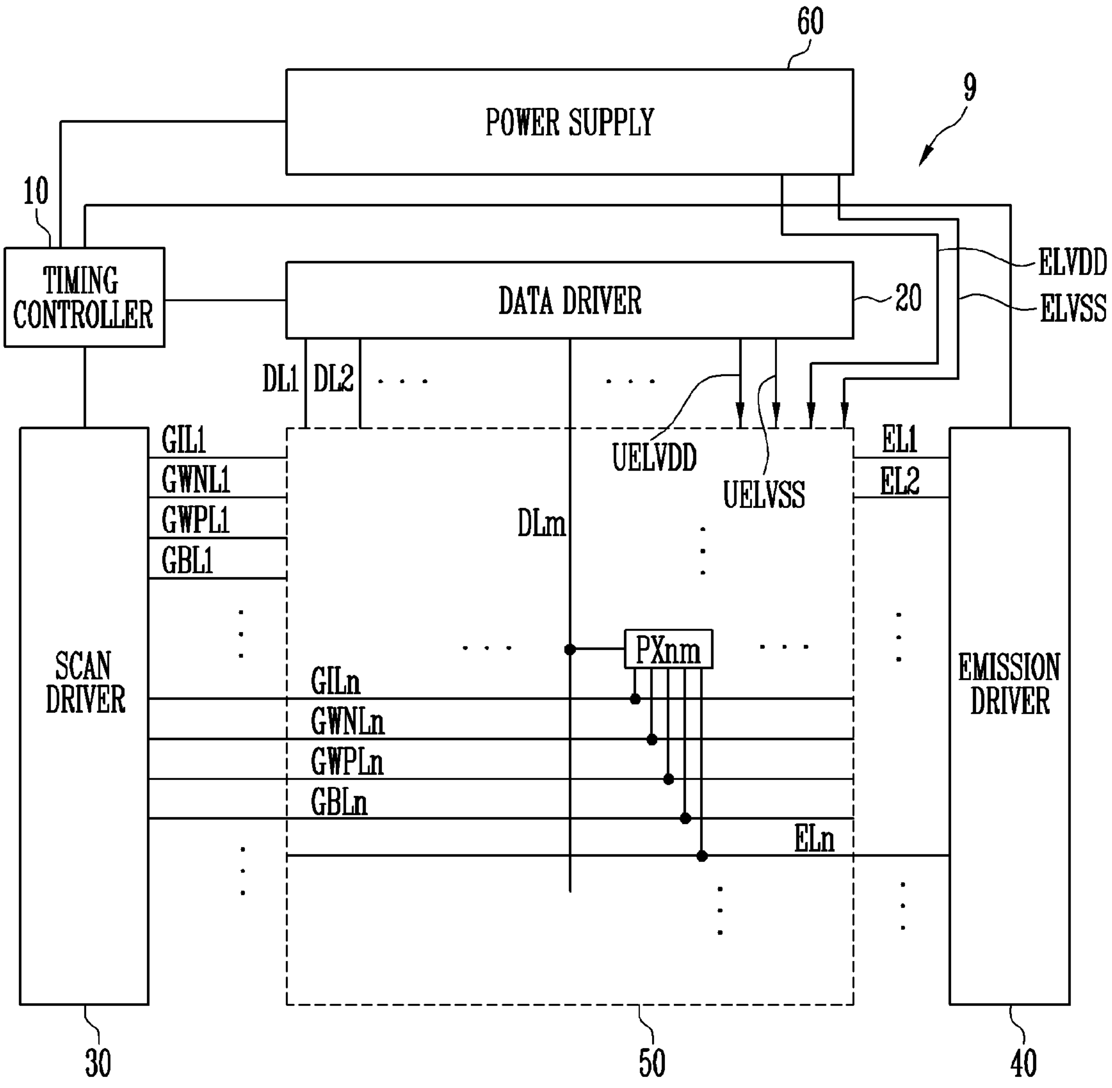
FIG. 1 is a block diagram showing a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the drawings, portions which are not related to the disclosure will be omitted in order to explain the disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram for describing a display device 9 in accordance with an embodiment of the disclosure.

Referring to FIG. 1, the display device 9 in accordance with an embodiment may include a timing controller 10, a data driver 20, a scan driver 30, an emission driver 40, a pixel component 50, and a power supply (also referred as a power supply unit, a power supplier or a power provider) 60.

The timing controller 10 may receive an external input signal from an external processor. The external input signal may include a horizontal synchronization signal (Hsync in FIG. 4), a vertical synchronization signal (Vsync shown in FIG. 11), a data enable signal (EN in FIG. 4), pixel data (Pixel Data in FIG. 11), or the like.

The vertical synchronization signal may include a plurality of pulses and indicate that a previous frame period ends and a current frame period starts based on a time point at which each pulse occurs. A distance between adjacent pulses of the vertical synchronization signal may correspond to 1 frame period. The horizontal synchronization signal may include a plurality of pulses and indicate that a previous horizontal period ends and a new horizontal period starts based on a time point at which each pulse occurs. A distance between adjacent pulses of the horizontal synchronization signal may correspond to one horizontal period. The data enable signal may have an enable level in specific horizontal periods and have a disabled level in the other periods. When the data enable signal has an enable level, this indicates that pixel data is supplied in corresponding horizontal periods. The pixel data may be supplied on a pixel row basis in each of the corresponding horizontal periods. The timing controller 10 may generate grayscale values based on the pixel data to correspond to specifications of the display device 9. The timing controller 10 may generate control signals to be supplied to the data driver 20, the scan driver 30, the emission driver 40, the power supply 60, or the like, based on the external input signal to correspond to the specifications of the display device 9.

The power supply 60 may receive an input voltage from a battery or the like, and may convert the input voltage and thus generate a first power supply voltage ELVDD and a second power voltage ELVSS. The power supply 60 may receive a power control signal from the timing controller 10, and may provide the first power voltage ELVDD and the second power voltage ELVSS to the pixel component 50 based on the power control signal. In an embodiment, for example, the power supply 60 may be formed of (or defined by) a power management integrated chip (PMIC).

In an embodiment, for example, the power supply 60 may supply, in a first display mode, the first power voltage ELVDD to a first power line and supply the second power voltage ELVSS to a second power line, and may suspend, in a second display mode, the supply of the first power voltage ELVDD and the second power voltage ELVSS. In an embodiment, for example, the first display mode may be a general display mode (e.g., a high frequency display mode, a low frequency display mode, or the like), and the second display mode may be a low power display mode (e.g., an always on display (AOD) mode, or the like). In an embodiment, for example, the AOD mode may be a mode in which simple information such as the time/date is displayed in black and white in the case where a user does not use the display device 9 for a relatively long time. In an embodiment, a display frequency of the second display mode may be lower than a display frequency of the low frequency display mode.

The data driver 20 may generate data voltages to be provided to data lines DL1, DL2, and DLm, based on grayscale values and control signals that are received from the timing controller 10. In an embodiment, for example, the data driver 20 may sample the grayscale values using a clock signal, and apply data voltages corresponding to the grayscale values to the data lines DL1, DL2, and DLm on a basis of a pixel row (for example, pixels connected to the same scan line and the same emission line).

In the second display mode, the data driver 20 may supply a first power voltage UELVDD to the first power line, and may supply a second power voltage UELVSS to the second power line. In an embodiment, for example, in the first display mode, the data driver 20 may suspend the supply of the first power voltage UELVDD and the second power voltage UELVSS. In an embodiment, for example, the data driver 20 may include a low dropout circuit, and may drop an input voltage and thus generate the first power voltage UELVDD and the second power voltage UELVSS. In an embodiment, the input voltage of the data driver 20 and the input voltage of the power supply 60 may differ from each other. In an embodiment, for example, the input voltage of the data driver 20 may be provided from the power supply 60.

In an embodiment, for example, the second power voltage UELVSS in the second display mode may be greater than the second power voltage ELVSS in the first display mode. In an embodiment, for example, the first power voltage UELVDD in the second display mode may be greater than the first power voltage ELVDD in the first display mode. Therefore, a difference between the first power voltage UELVDD and the second power voltage UELVSS in the second display mode is less than a difference between the first power voltage ELVDD and the second power voltage ELVSS in the first display mode, so that the second display mode can be driven with low power consumption compared to the first display mode.

The scan driver 30 may receive a clock signal, a scan start signal, or the like from the timing controller 10, and generate scan signals to be provided to scan lines GIL1, GWNL1, GWPL1, GBL1, GILn, GWNLn, GWPLn, and GBLn. Here, n is an integer greater than 0.

The scan driver 30 may include a plurality of sub-scan drivers. In an embodiment, for example, the first sub-scan driver may provide scan signals to the scan lines GIL1 and GILn. The second sub-scan driver may provide scan signals to the scan lines GWNL1 and GWNLn. The third sub-scan driver may provide scan signals to the scan lines GWPL1 and GWPLn. The fourth sub-scan driver may provide scan signals to the scan lines GBL1 and GBLn. Each of the sub-scan drivers may include a plurality of scan stages connected in the form of a shift register. In an embodiment, for example, scan signals may be generated in such a way that a turn-on level pulse of a scan start signal supplied to a scan start line is sequentially transmitted to a subsequent scan stage.

The emission driver 40 may receive a clock signal, and an emission stop signal, or the like from the timing controller 10 and generate emission signals to be provided to emission lines EL1, EL2, and ELn. In an embodiment, for example, the emission driver 40 may sequentially supply emission signals each having a turn-off level pulse to the emission lines EL1, EL2, and ELn. In an embodiment, for example, the emission driver 40 may be in the form of a shift register and generate emission signals in a manner of sequentially transmitting a turn-off level pulse of an emission stop signal to a subsequent emission stage under control of the clock signal.

The pixel component 50 includes pixels. In an embodiment, for example, a pixel PXnm may be coupled to a corresponding data line DLm, corresponding scan lines GILn, GWNLn, GWPLn, and GBLn, and a corresponding emission line ELn. As described above, pixels connected to a same scan line and a same emission line may in a same pixel row. The pixels of the pixel component 50 may be connected in common to the first power line and the second power line.

Figure 2:
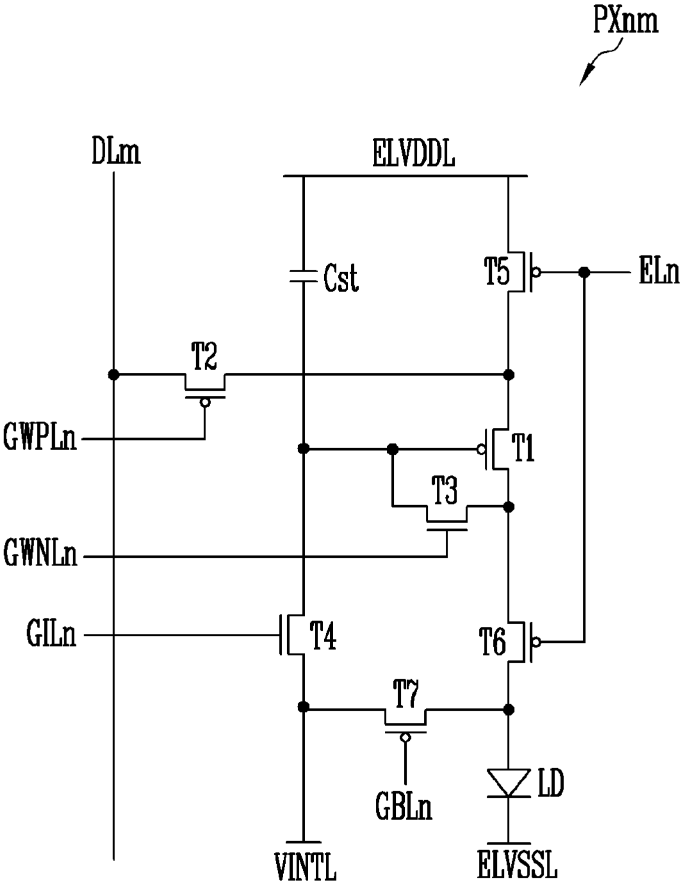
FIG. 2 is a circuit diagram showing a pixel in accordance with an embodiment of the disclosure.

FIG. 2 is a circuit diagram showing a pixel PXnm in accordance with an embodiment of the disclosure.

Referring to FIG. 2, the pixel PXnm in accordance with an embodiment of the disclosure includes transistors T1, T2, T3, T4, T5, T6, and T7, a storage capacitor Cst, and a light emitting diode LD.

The transistor T1 may include a first electrode connected to a first electrode of the transistor T2, a second electrode connected to a first electrode of the transistor T3, and a gate electrode connected to a second electrode of the transistor T3. The transistor T1 may be referred to as a driving transistor.

The transistor T2 may include the first electrode connected to the first electrode of the transistor T1, a second electrode connected to a data line DLm, and a gate electrode connected to the scan line GWPLn. The transistor T2 may be referred to as a scan transistor.

The transistor T3 may include the first electrode connected to the second electrode of the transistor T1, the second electrode connected to the gate electrode of the transistor T1, and a gate electrode connected to the scan line GWNLn. The transistor T3 may be referred to as a diode connection transistor.

The transistor T4 may include a first electrode connected to a second electrode of the capacitor Cst, a second electrode connected to an initialization line VINTL, and a gate electrode connected to the scan line GILn. The transistor T4 may be referred to as a gate initialization transistor.

The transistor T5 may include a first electrode connected to the first power line ELVDDL, a second electrode connected to the first transistor of the transistor T1, and a gate electrode connected to the emission line ELn. The transistor T5 may be referred to as a first emission transistor.

The transistor T6 may include a first electrode connected to the second electrode of the transistor T1, a second electrode connected to an anode of the light emitting element diode LD, and a gate electrode connected to the emission line ELn. The transistor T6 may be referred to as a second emission transistor.

The transistor T7 may include a first electrode connected to the anode of the light emitting element diode LD, a second electrode connected to the initialization line VINTL, and a gate electrode connected to the scan line GBLn. The transistor T7 may be referred to as an anode initialization transistor.

The storage capacitor Cst may include a first electrode connected to the first power line ELVDDL, and the second electrode connected to the gate electrode of the transistor T1.

The light emitting diode LD may include the anode connected to the second electrode of the transistor T6, and a cathode connected to the second power line ELVSSL. The light emitting diode LD may be an organic light emitting diode, an inorganic light emitting diode, a quantum dot light emitting diode, or the like.

Each of the transistors T1, T2, T5, T6, and T7 may be a P-type transistor. Channels of the transistors T1, T2, T5, T6, and T7 may include or be formed of poly silicon. The poly silicon transistor may be a low temperature poly silicon (LTPS) transistor. The poly silicon transistor may have high electron mobility and thus have high-speed driving characteristics.

The transistors T3 and T4 may be N-type transistors. The channels of the transistors T3 and T4 may include or be formed of oxide semiconductors. An oxide semiconductor transistor may be produced through a low-temperature process, and have low charge mobility compared to that of the poly-silicon transistor. Therefore, the amount of leakage current in oxide semiconductor transistors that is in a turn-off state may be less than that of poly-silicon transistors.

In an embodiment, the transistor T7 may be an N-type oxide semiconductor transistor rather than a poly-silicon transistor. Here, one of the scan lines GWNLn and GILn in lieu of the scan line GBLn may be connected to the gate electrode of the transistor T7.

Figure 3:
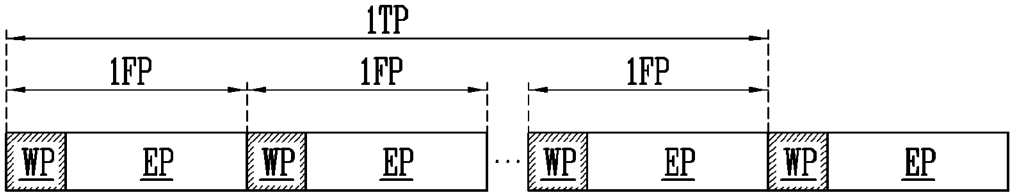
FIG. 3 is a diagram for describing a high frequency display mode in accordance with an embodiment of the disclosure.

FIG. 3 is a diagram for describing a high frequency display mode in accordance with an embodiment of the disclosure.

In a case where the pixel component 50 displays image frames at a first driving frequency, it can be expressed that the display device 9 is in a high frequency display mode. Furthermore, in a case where the pixel component 50 displays image frames at a second driving frequency less than the first driving frequency, it can be expressed that the display device 9 is in a low frequency display mode.

In the high frequency display mode, the display device 9 may display image frames at 60 hertz (Hz) or more, e.g., 60

Hz, 120 Hz, or the like. In the low frequency display mode, the display device 9 may display image frames at a frequency less than 60 Hz, e.g., 20 Hz, 1 Hz, or the like. For reference, in the second display mode, image frames may be displayed at a high frequency or may be displayed at a low frequency.

A period 1TP may include a plurality of frame periods 1FP. The period 1TP may be a period which is arbitrarily defined to compare the high frequency display mode and the low frequency display mode. The period 1TP may refer to the same time interval in the high frequency display mode and the low frequency display mode.

In the high frequency display mode, each of the frame periods 1FP may include a data write period WP and an emission period EP. For convenience of illustration and description, FIG. 3 illustrates that, based on a first pixel row, the data write period WP is located in an initial stage of the frame period 1FP, and the emission period EP is located at a stage subsequent to the data write period WI'. However, in the case where a pixel row is not the first pixel row, the data write period WP may be located in a middle stage or a last stage of the frame period 1FP.

Therefore, the pixel PXnm may display a plurality of image frames corresponding to the number of frame periods 1FP during the period 1TP, based on data voltages received during data write periods WI'.

Figure 4:
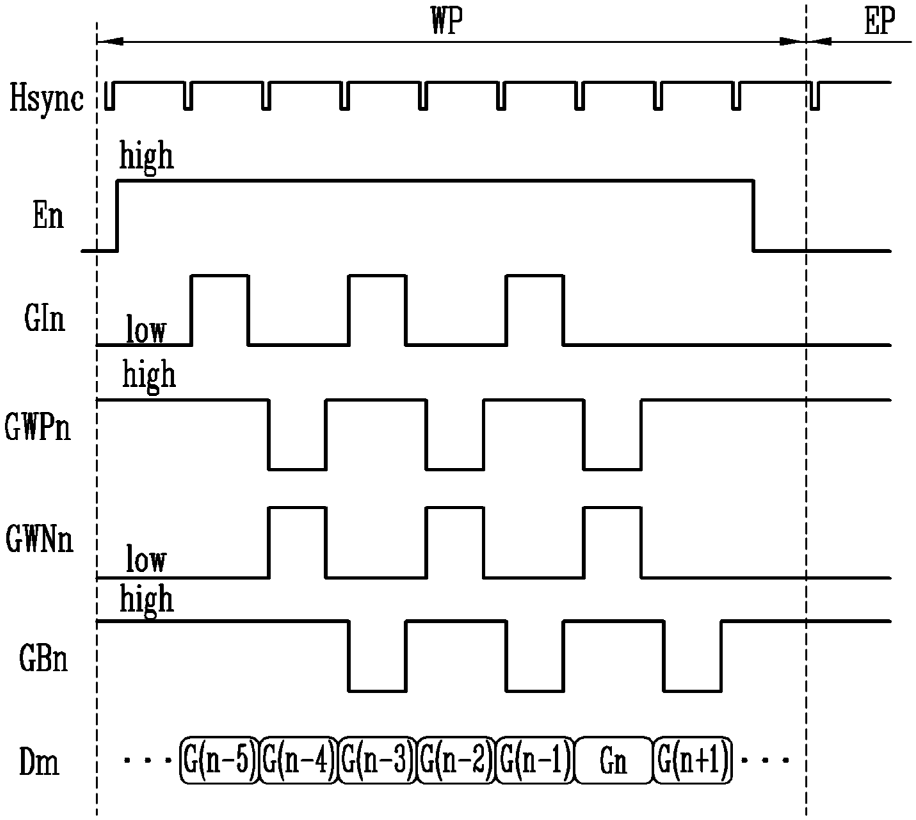
FIG. 4 is a signal timing diagram for describing a data write period in accordance with an embodiment of the disclosure.
Figure 5:
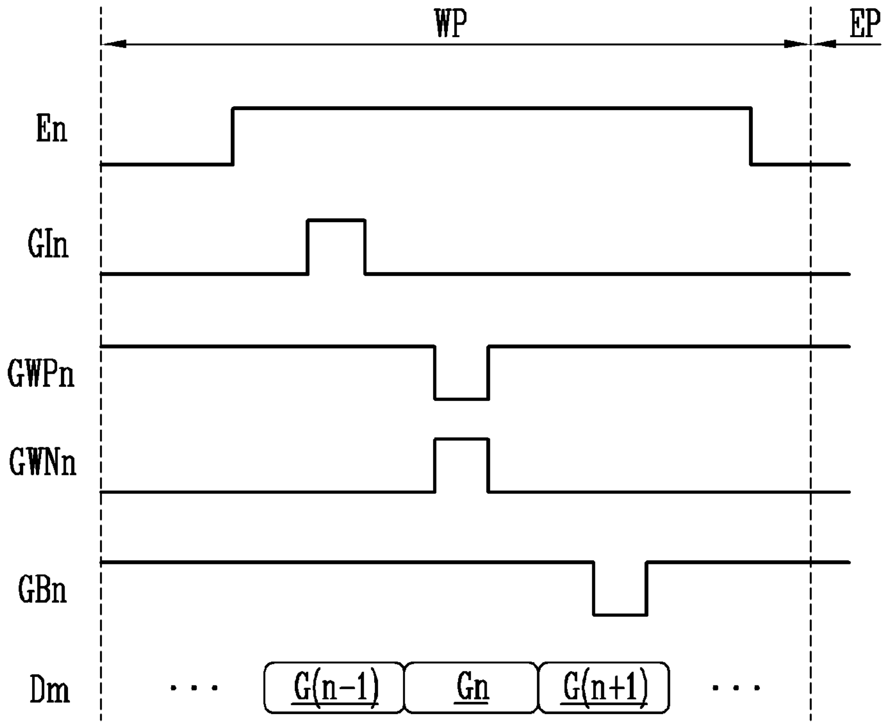
FIG. 5 is a signal timing diagram for describing a data write period in accordance with an embodiment of the disclosure.

FIG. 4 is a signal timing diagram for describing a data write period in accordance with an embodiment of the disclosure. FIG. 5 is a signal timing diagram for describing a data write period in accordance with an embodiment of the disclosure.

First, during the data write period WP, an emission signal En having a turn-off level (or a high level) may be applied to the emission line ELn. Therefore, during the data write period WP, the transistors T5 and T6 may be in a turned-off state.

First, a first pulse having a turn-on level (a high level) is supplied to the scan line Gln. Hence, the transistor T4 is turned on, so that the gate electrode of the transistor T1 and the initialization line VINTL are connected to each other. Therefore, a voltage of the gate electrode of the transistor T1 is initialized to an initialization voltage of the initialization line VINTL, and is maintained by the storage capacitor Cst. In an embodiment, for example, the initialization voltage of the initialization line VINTL may be a voltage sufficiently lower than the voltage of the first power line ELVDDL. In an embodiment, for example, the initialization voltage may be a voltage having a level equal or similar to that of the voltage of the second power line ELVSSL. Therefore, the transistor T1 may be turned on.

Subsequently, first pulses each having a turn-on level are applied to the scan lines GWPn and GWNn, so that the corresponding transistors T2 and T3 are turned on. Hence, a data voltage Dm applied to the data line DLm is written to the storage capacitor Cst through the transistors T2, T1, and T3. Here, the data voltage Dm may correspond to a grayscale value G(n−4) of the pixel PXnm before four horizontal cycles, and may be provided to apply an on-bias voltage to the transistor T1 rather than to allow the pixel PXnm to emit light. In such an embodiment, the on-bias voltage is applied to the transistor T1 before a target data voltage Dm is written thereto, such that a hysteresis phenomenon can be mitigated.

Thereafter, a first pulse having a turn-on level (a low level) is supplied to the scan line GBn, so that the transistor T7 is turned on. Hence, the anode voltage of the light emitting diode LD is initialized.

Here, a second pulse having a turn-on level (a high level) is supplied to the scan line GILn, so that the foregoing driving process is re-performed. In other words, an on-bias voltage is applied again to the transistor T1, so that the anode voltage of the light emitting diode LD is initialized.

When third pulses each having a turn-on level are supplied to the scan lines GWPLn and GWNLn by iteration of the foregoing process, a data voltage Dm corresponding to a grayscale value Gn of the pixel PXnm is written to the storage capacitor Cst. Here, the data voltage Dm written to the storage capacitor Cst may be a voltage in which a decrement in threshold voltage of the transistor T1 is reflected.

Lastly, when the voltage level of the emission signal En becomes a turn-on level (a low level), the transistors T5 and T6 are turned on. Hence, a driving current path is formed through the first power line ELVDDL, the transistors T5, T1, and T6, and the light emitting diode LD, and the second power line ELVSSL, so that driving current flows along the driving current path. The amount of driving current may corresponds to the data voltage Dm stored in the storage capacitor Cst. Here, as driving current flows via the transistor T1, the decrement in threshold voltage of the transistor T1 is reflected. Accordingly, the threshold voltage decrement that is reflected in the data voltage Dm stored in the storage capacitor Cst and the threshold voltage decrement that is reflected in the driving current may offset each other, so that driving current corresponding to the data voltage Dm can flow regardless of the threshold voltage of the transistor T1. According to the amount of driving current, the light emitting diode LD may emit light at a target luminance.

In an embodiment, as described above, each of the scan signals includes three pulses during the data write period WP, but not being limited thereto. In an alternative embodiment, each of the scan signals may include two pulses or four or more pulses during the data write period WP. In another alternative embodiment, each of the scan signals may include one pulse during the data write period WP. In such an embodiment, a process of applying an on-bias voltage to the transistor T1 may be omitted as shown in FIG. 5.

In an embodiment, a distance between adjacent pulses of the horizontal synchronization signal Hsync may correspond to one horizontal period. FIG. 4 illustrates that the pulse of the horizontal synchronization signal Hsync has a low level, but in an embodiment, the pulse has a high level.

Figure 6:
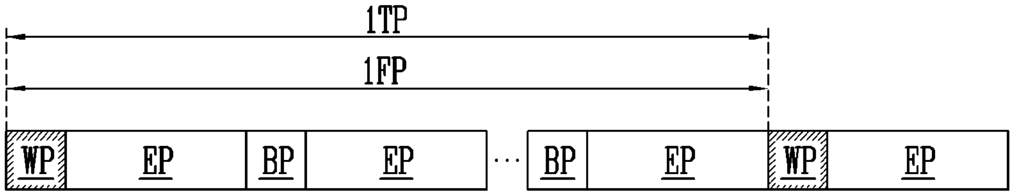
FIG. 6 is a diagram for describing a low frequency display mode in accordance with an embodiment of the disclosure.

FIG. 6 is a diagram for describing a low frequency display mode in accordance with an embodiment of the disclosure.

In the low frequency display mode, a period 1TP may include one frame period 1FP. In other words, the period 1TP may be the same as the 1 frame period 1 FP. Each frame period 1FP may include a data write period WP, emission periods EP, and bias refresh periods BP. In each frame period 1FP, the emission periods EP and the bias refresh periods BP alternate with each other after a data write period WP.

The transistors T3 and T4 of the pixel PXnm remain turned off during the emission periods EP and the bias refresh periods BP, so that the storage capacitor Cst maintains the same data voltage during the period 1TP. In such an embodiment, the transistors T3 and T4 may include or be formed of oxide semiconductor transistors, such that leakage current can be minimized.

Therefore, the pixel PXnm may display a single image frame during the period 1TP, based on a data voltage received during the data write period WP.

Figure 7:
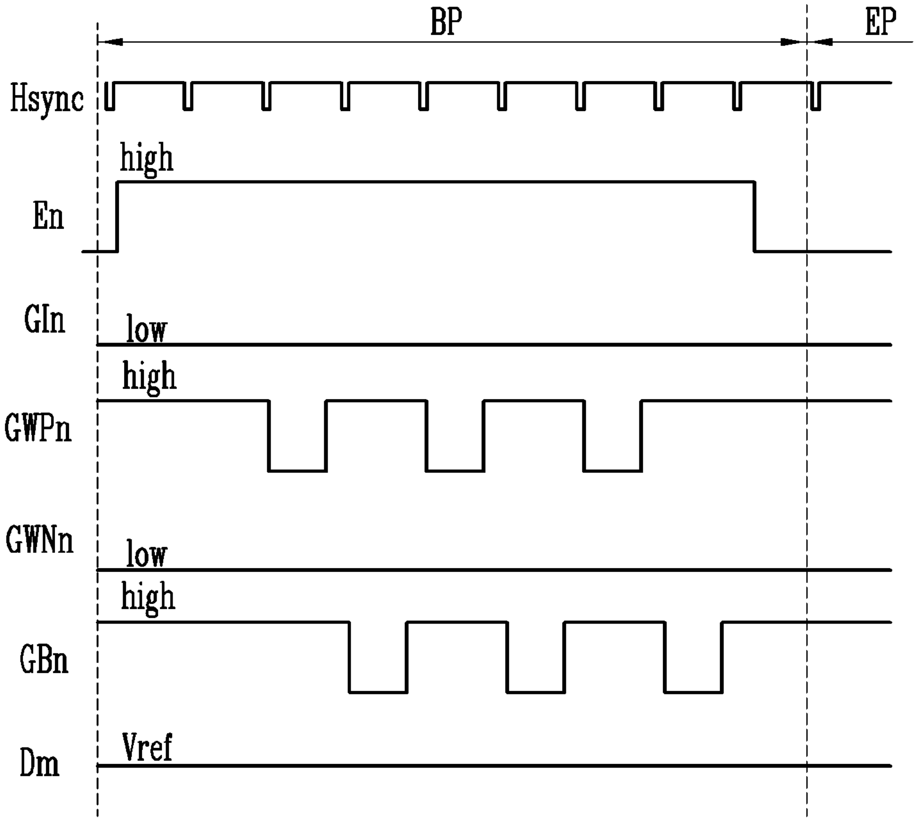
FIG. 7 is a signal timing diagram for describing a bias refresh period in accordance with an embodiment of the disclosure.

FIG. 7 is a signal diagram for describing a bias refresh period in accordance with an embodiment of the disclosure.

Figure 8:
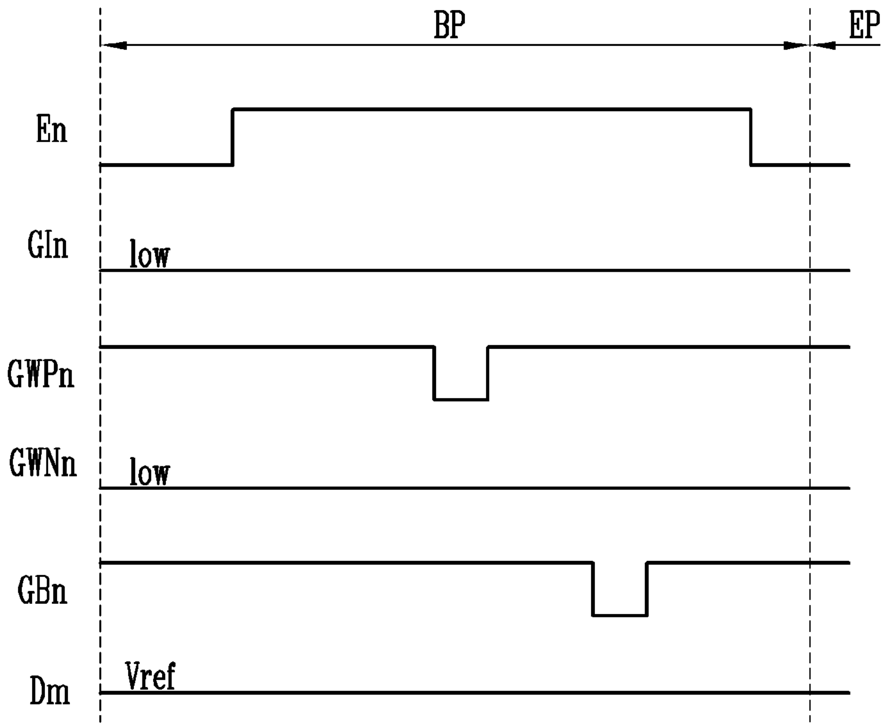
FIG. 8 is a signal timing diagram for describing a bias refresh period in accordance with an embodiment of the disclosure.

FIG. 8 is a signal diagram for describing a bias refresh period in accordance with an embodiment of the disclosure.

Referring to FIG. 7, during the bias refresh period BP, scan signals Gin and GWNn each having a turn-off level (a low level) are supplied. Therefore, as described above, during the bias refresh period BP, the data voltage written in the storage capacitor Cst remain constant. Here, a reference data voltage Vref may be applied to the data line DLm.

During the bias refresh period BP, an emission signal En and scan signals GWPn and GBn that have the same waveform as those in the data write period WP may be supplied as shown in FIGS. 5 to 8. Therefore, the waveform of output light during the period 1TP in the low frequency display mode is substantially the same as or similar to the waveform of output light during the period 1TP in the high frequency display mode, so that flicker attributable to frequency changes may not be visible to the user.

Figure 9:
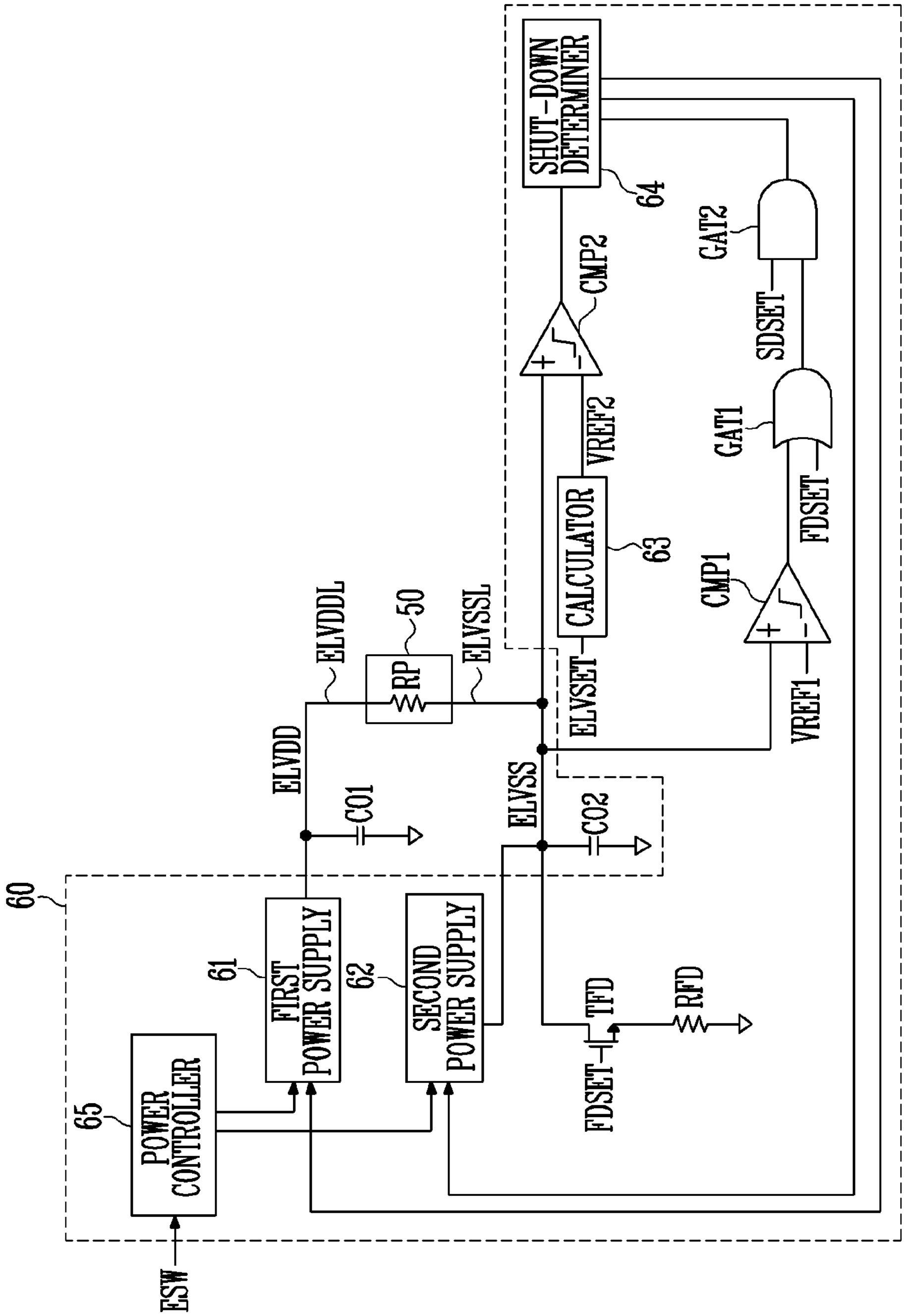
FIG. 9 is a block diagram showing a power supply in accordance with an embodiment of the disclosure.

FIG. 9 is a block diagram showing the power supply in accordance with an embodiment of the disclosure.

Referring to FIG. 9, the power supply 60 in accordance with an embodiment of the disclosure may include a first power supply 61, a second power supply 62, a calculator 63, a shut-down determiner 64, a power controller 65, a discharge transistor TFD, a discharge resistor RFD, a first comparator CMP1, a second comparator CMP2, a first gate GAT1, and a second gate GAT2. In an embodiment, the first output capacitor CO1 and the second output capacitor CO2 may be located outside the power supply 60 if a surface area for installation of the power supply is relatively large.

The power controller 65 may receive a power control signal ESW from the timing controller 10. The power controller 65 may control whether to generate a first power voltage ELVDD from the first power supply 61, the magnitude of the first power voltage ELVDD, or the like, based on the power control signal ESW. The power controller 65 may control whether to generate a second power voltage ELVSS from the second power supply 62, the magnitude of the second power voltage ELVSS, or the like, based on the power control signal ESW.

The first power supply 61 may generate the first power voltage ELVDD. The second power supply 62 may generate the second power voltage ELVSS. Each of the first power supply 61 and the second power supply 62 may include or be formed of a direct current-to-direct current (DC-DC) converter. In an embodiment, for example, the first power supply 61 may be a boost converter, and the second power supply 62 may be a buck-boost converter. Alternatively, the first power supply 61 and the second power supply 62 may be formed of other types of known converters.

The first output capacitor CO1 may be connected to an output terminal of the first power supply 61. The second output capacitor CO2 may be connected to an output terminal of the second power supply 62. The first power line ELVDDL may connect the pixels of the pixel component 50 with the output terminal of the first power supply 61. The second power line ELVSSL may connect the pixels of the pixel component 50 with the output terminal of the second power supply 62. A short-circuit resistor RP is provided in the pixel component 50 by modeling a resistor in a case where the first power line ELVDDL and the second power line ELVSSL are short-circuited by a crack occurring in the pixel component 50.

The discharge transistor TFD may include a first electrode connected to the second power line ELVSSL, a second electrode connected to a first electrode of the discharge resistor RFD, and a gate electrode that receives a discharge setting signal FDSET. In an embodiment, for example, the timing controller 10 may provide the discharge setting signal FDSET to the power supply 60. The first electrode of the discharge resistor RFD may be connected to the discharge transistor TFD, and a second electrode thereof may be connected to a ground terminal. In a case where it is determined to discharge the second power line ELVSSL, the discharge transistor TFD may be turned on in response to a discharge setting signal FDSET having a turn-on level. In an embodiment, for example, in a case where the display device 9 is in a power-off or sleep-in state, the discharge transistor TFD may be turned on. The power-off may refer to a case where the display device 9 is turned off. The sleep-in may refer to a case where the display device 9 enters a waiting mode. In some periods of a short-circuit test operation, the discharge transistor TFD may be turned on. During the other period (e.g., an image display period), the discharge transistor TFD may remain turned off.

A first input terminal of the first comparator CMP1 may be connected to the second power line ELVSSL, and a second input terminal thereof may receive the first reference voltage VREF1. In an embodiment, for example, the first input terminal may be a non-inverting terminal. The second input terminal may be an inverting terminal. In a case where the second power voltage ELVSS of the second power line ELVSSL is greater than the first reference voltage VREF1, the first comparator CMP1 may output a logic level signal corresponding to TRUE. In a case where the second power voltage ELVSS of the second power line ELVSSL is less than the first reference voltage VREF1, the first comparator CMP1 may output a logic level signal corresponding to FALSE.

A first input terminal of the first gate GAT1 may be connected to an output terminal of the first comparator CMP1, and a second input terminal thereof may receive a discharge setting signal FDSET. A discharge setting signal FDSET having a turn-on level may be a logic level signal corresponding to TRUE. A discharge setting signal FDSET having a turn-off level may be a logic level signal corresponding to FALSE. In an embodiment, for example, the first gate GAT1 may be an OR gate. The first gate GAT1 may output a logic level signal corresponding to TRUE when the logic level signal of the first input terminal is TRUE, or the logic level signal of the second input terminal is TRUE.

A first input terminal of the second gate GAT2 may receive a short-circuit detection setting signal SDSET, and a second input terminal thereof may be connected to an output terminal of the first gate GAT1. In an embodiment, for example, the timing controller 10 may provide the short-circuit detection setting signal SDSET to the power supply 60. In a case where the display device 9 uses a short-circuit detection function, the short-circuit detection setting signal SDSET may be a logic level signal corresponding to TRUE. In a case where the display device 9 does not use the short-circuit detection function, the short-circuit detection setting signal SDSET may be a logic level signal corresponding to FALSE. In an embodiment, for example, the second gate GAT2 may be an AND gate. The second gate GAT2 may output a logic level signal corresponding to TRUE when both the logic level signal of the first input terminal and the logic level signal of the second input terminal are TRUE.

The calculator 63 may compute a second reference voltage VREF2 based on a first power voltage setting value ELVSET. The first power voltage setting value ELVSET may be a digital value of the first power voltage ELVDD to be applied to the first power line ELVDDL. In an embodiment, for example, the timing controller 10 may provide the first power voltage setting value ELVSET to the power supply 60.

As the first power voltage setting value ELVSET is lowered, the second reference voltage VREF2 to be provided from the calculator 63 may be lowered. As the magnitude of the first power voltage ELVDD is reduced, the magnitude of current flowing through the short-circuit resistor RP when the first power line ELVDDL and the second power line ELVSSL are short-circuited may be reduced. Therefore, the voltage to be applied to the discharge resistor RFD in a short-circuit test operation may also be reduced. Therefore, in a case where the second reference voltage VFEF2 is maintained, whether a short-circuit has occurred cannot be appropriately detected. According to an embodiment of the disclosure, the short-circuit test function can be reliably performed even when the magnitude of the first power voltage ELVDD is small.

In an embodiment, for example, the calculator 63 may compute the second reference voltage VREF2 according to the following equation 1.

$$VREF2v=ELVSET*RFDv/(RPv+RFDv) \quad \text{[Equation 1]}$$

In Equation 1, VREF2*v* denotes a voltage value of the second reference voltage VREF2, ELVSET denotes a first power voltage setting value ELVSET, RFDv denotes a resistance value of the discharge resistor RFD, and RPv denotes a resistance value of the short-circuit resistor RP. Here, the RFDv may be a value obtained by adding up (or summing) the resistance value of the discharge resistor RFD and an on-resistance value of the discharge transistor TFD.

A first input terminal of the second comparator CMP2 may be connected to the second power line ELVSSL, and a second input terminal thereof may receive the second reference voltage VREF2. In an embodiment, for example, the first input terminal may be a non-inverting terminal. The second input terminal may be an inverting terminal. In a case where the second power voltage ELVSS of the second power line ELVSSL is greater than the second reference voltage VREF2, the second comparator CMP2 may output a logic level signal corresponding to TRUE. In a case where the second power voltage ELVSS of the second power line ELVSSL is less than the second reference voltage VREF2, the second comparator CMP2 may output a logic level signal corresponding to FALSE.

The shut-down determiner 64 may determine whether to shut down the first power supply 61 and the second power supply 62, based on an output logic signal of the second gate GAT2 and an output logic signal of the second comparator CMP2. In an embodiment, for example, only when both the output logic signal of the second gate GAT2 and the output logic signal of the second comparator CMP2 are TRUE, the shut-down determiner 64 may shut down the first power supply 61 and the second power supply 62.

Figure 11:
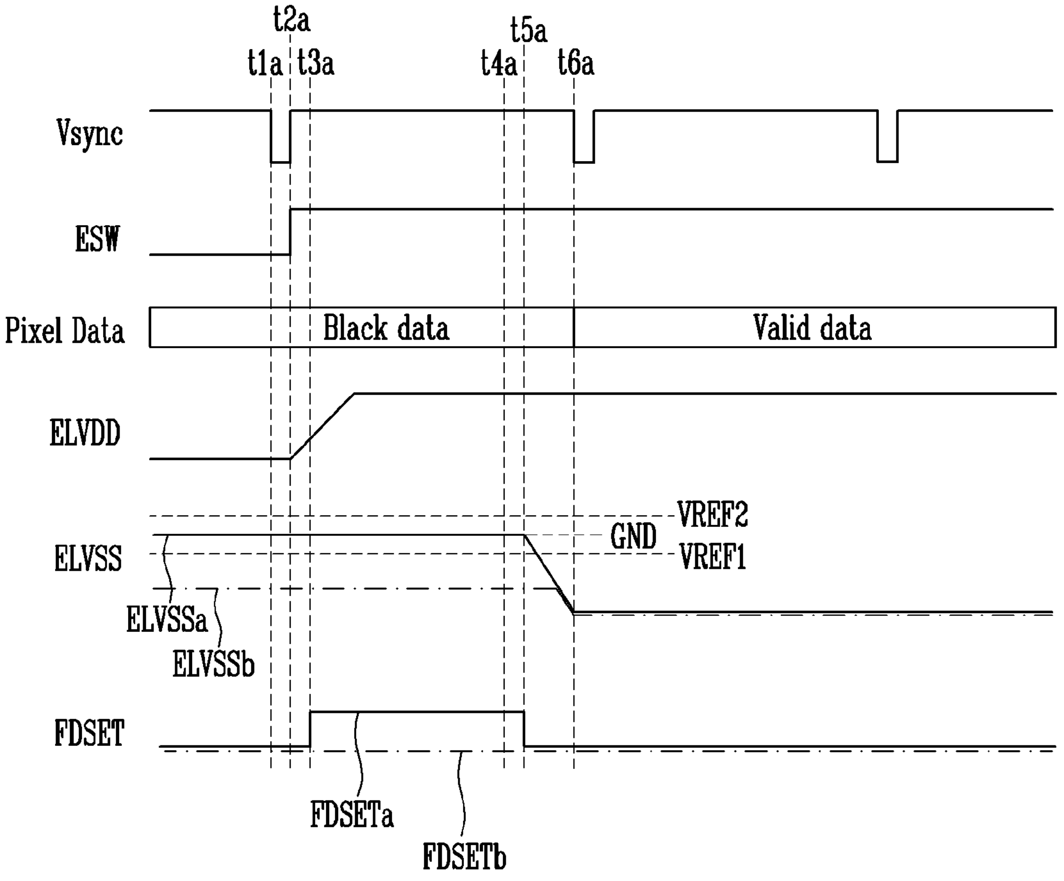
Figure 12:
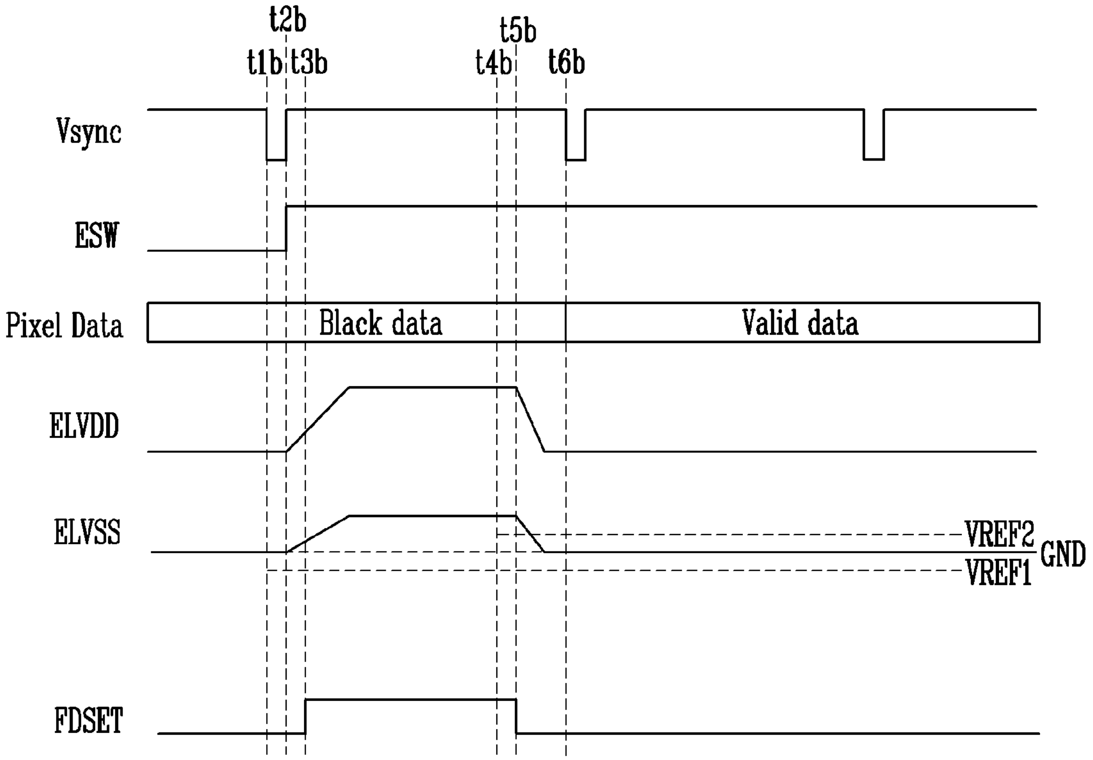

In an embodiment, for example, in a case where the second power voltage ELVSS is greater the first reference voltage VREF1 at a first time point t2*b*, and the second power voltage ELVSS is greater than the second reference voltage VREF2 at a second time point t4*b*, the shut-down determiner 64 may shut down the first power supply 61 and the second power supply 62 (refer to FIG. 12). The second time point t4*b* is after the first time point t2*b*, and an interval between the first time point t2*b* and the second time point t4*b* may be shorter than 1 frame period (refer to FIG. 12). Operations of the power supply 60 will be described in detail with reference to FIGS. 10 to 12.

Figure 10:
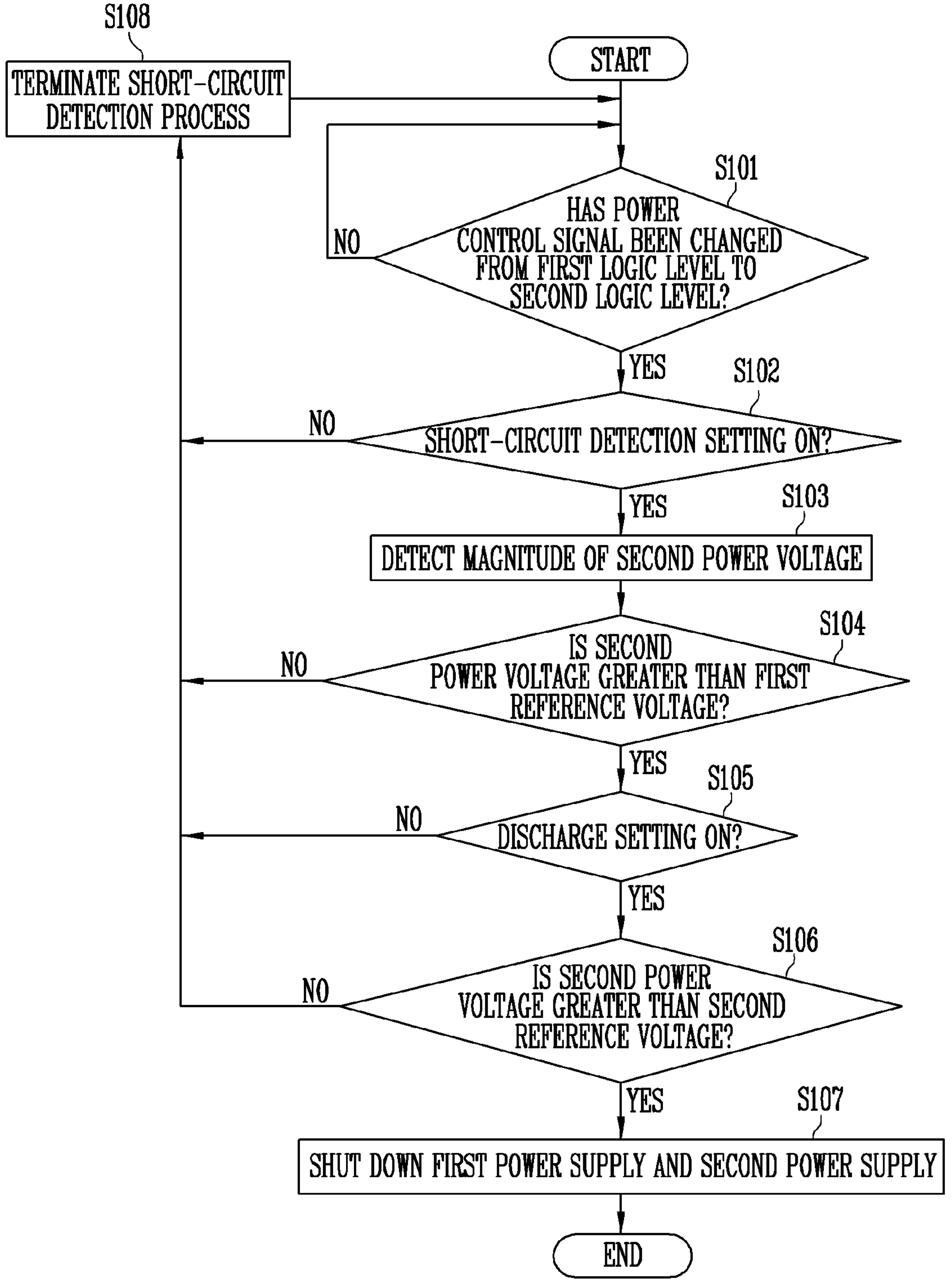
FIGS. 10 to 12 are diagrams for describing a method of driving the display device in accordance with an embodiment of the disclosure.

FIGS. 10 to 12 are diagrams for describing a method of driving the display device in accordance with an embodiment of the disclosure.

FIG. 11 illustrates a case where there is no short-circuit in the display device 9. FIG. 11 shows signal timings of a vertical synchronization signal Vsync, a power control signal ESW, pixel data Pixel Data, a first power voltage ELVDD, a second power voltage ELVSS, and a discharge setting signal FDSET.

Each cycle of the pulses in the vertical synchronization signal Vsync may correspond to 1 frame period. In an embodiment, for example, a period from a time point t1*a* to a time point t6*a* may correspond to 1 frame period. The period from t1*a* to t6*a* is a period for determining whether to provide power, so that black data may be supplied as pixel data because it is desired not to display an image during the period from t1*a* to t6*a*. In frame periods after the time point t6*a*, valid data may be supplied. The black data may be data corresponding to a black screen. The valid data may be data corresponding to an image to be provided to the user.

At a time point t2*a*, the power control signal ESW may be changed from a first logic level (e.g., a low logic level) to a second logic level (e.g., a high logic level) (S101 in FIG. 10). The foregoing case may correspond to a case where the display device 9 is powered on, a case where the display device 9 enters a sleep-out state (a case where a waiting mode is terminated), or a case where the display device 9 is converted from the second display mode to the first display mode. At the time point t2*a*, the first power supply 61 may increase the first power voltage ELVDD. In an embodiment, based on a waveform of a separate power control signal ESW after the time point t2*a*, the first power supply 61 may increase the first power voltage ELVDD.

The power supply 60 may check whether short-circuit detection setting is in an ON state. If the short-circuit detection setting of the display device 9 is the ON state, the short-circuit detection setting signal SDSET may be a logic level signal corresponding to TRUE. If the short-circuit detection setting signal SDSET is a logic level signal corresponding to FALSE, the power supply 60 may terminate the short-circuit detection process (S108 in FIG. 10).

If the short-circuit detection setting signal SDSET is a logic level signal corresponding to TRUE, the power supply 60 may terminate the magnitude of the second power voltage ELVSS (S103 in FIG. 10). During a period from t2*a* to t3*a* for detecting the magnitude of the second power, a discharge setting signal FDSETb may be maintained at a turn-off level.

The first comparator CMP1 may compare the magnitude of the second power voltage ELVSS and the magnitude of the first reference voltage VREF1. The first reference voltage VREF1 may be set to be less than a ground voltage GND. Although varying depending on specifications of the display device 9, for example, the first reference voltage VREF1 may be set to about −0.2 volt (V).

If the display device 9 is converted from the second display mode to the first display mode, a second power voltage ELVSSb may be less than the first reference voltage VREF1 during a period from t2*a* to t3*a* (S104 in FIG. 10). The reason for this is because the second power voltage ELVSSb is the second power voltage UELVSS provided from the data driver 20 to display an image with low power consumption during the second display mode (refer to FIG. 10). If the second power voltage ELVSSb is less than the first reference voltage VREF1, the short-circuit detection process may be terminated (S108 in FIG. 10).

To perform the short-circuit detection process, the discharge setting signal FDSET is to be at a turn-on level. Here, if, during the second display mode, the second power voltage ELVSSb is increased to the ground voltage GND (refer to ELVSSa in FIG. 11), the screen may glitter, and an abnormal luminance image may be visible to the user. Therefore, it is desirable that the short-circuit detection process is not performed while the second display mode is converted to the first display mode. Furthermore, because images have been normally displayed in the second display mode, the short-circuit detection process may not be desired.

In a case where the short-circuit detection process is not performed, the discharge setting signal FDSETb may be maintained at the turned-off level even after a time point t3*a*. Therefore, the first gate GAT1 and the second gate GAT2 may sequentially output logic level signals corresponding to FALSE, and the shut-down determiner 64 may not shut down the first power supply 61 and the second power supply 62.

If the display device 9 is powered on or the display device 9 enters a sleep-out state, the short-circuit detection process may be performed. In this case, during a period from t2*a* to t3*a*, a second power voltage ELVSSa may be greater than the first reference voltage VREF1 (S104 in FIG. 10). The reason for this is because the second power voltage ELVSSa is maintained at the ground voltage GND because the display device 9 has not displayed an image.

If the short-circuit detection process continues, the discharge setting signal FDSET may be at a turn-on level at the time point t3*a* so that the discharge setting enters an ON state (S105 in FIG. 10). During a period from t4*a* to t5*a*, the second comparator CMP2 may check whether the second power voltage ELVSSa is greater than the second reference voltage VREF2 (S106 in FIG. 10). If a portion of the pixel component 50 has not been short-circuited, there is no leakage current from the first power voltage ELVDD, so that the second power voltage ELVSSa may be maintained at the ground voltage GND. The second reference voltage VREF2 may be greater than the first reference voltage VREF1. In an embodiment, for example, the second reference voltage VREF2 may be greater than the ground voltage GND. Therefore, the second power voltage ELVSSa may be less than the second reference voltage VREF2, and the second comparator CMP2 may output a logic level signal corresponding to FALSE. Consequently, at the time point t5*a*, the shut-down determiner 64 does not shut down the first power supply 61 and the second power supply 62 (S108 in FIG. 10).

FIG. 12 illustrates a case where a short circuit is present in the pixel component 50. Descriptions pertaining to time points t1*b*, t2*b*, and t3*b* are the same as those of the time points t1*a*, t2*a*, and t3*a* of FIG. 11, and any repetitive detailed description thereof will be omitted.

If a short circuit is present in the pixel component 50, the second power voltage ELVSS at a time point t4*b* may be at a level higher than the second reference voltage VREF2 due to current leaking from the first power voltage ELVDD. Therefore, during a period from t4*b* to t5*b*, the second power voltage ELVSS is greater than the second reference voltage VREF2, so that the second comparator CMP2 may output a logic level signal corresponding to TRUE (S106 in FIG. 10). Hence, the shut-down determiner 64 receives logic level signals corresponding to TRUE from both the second gate GAT2 and the second comparator CMP2, so that the shut-down determiner 64 may shut down the first power supply 61 and the second power supply 62 at a time point t5*b* (S107 in FIG. 10).

Figure 13:
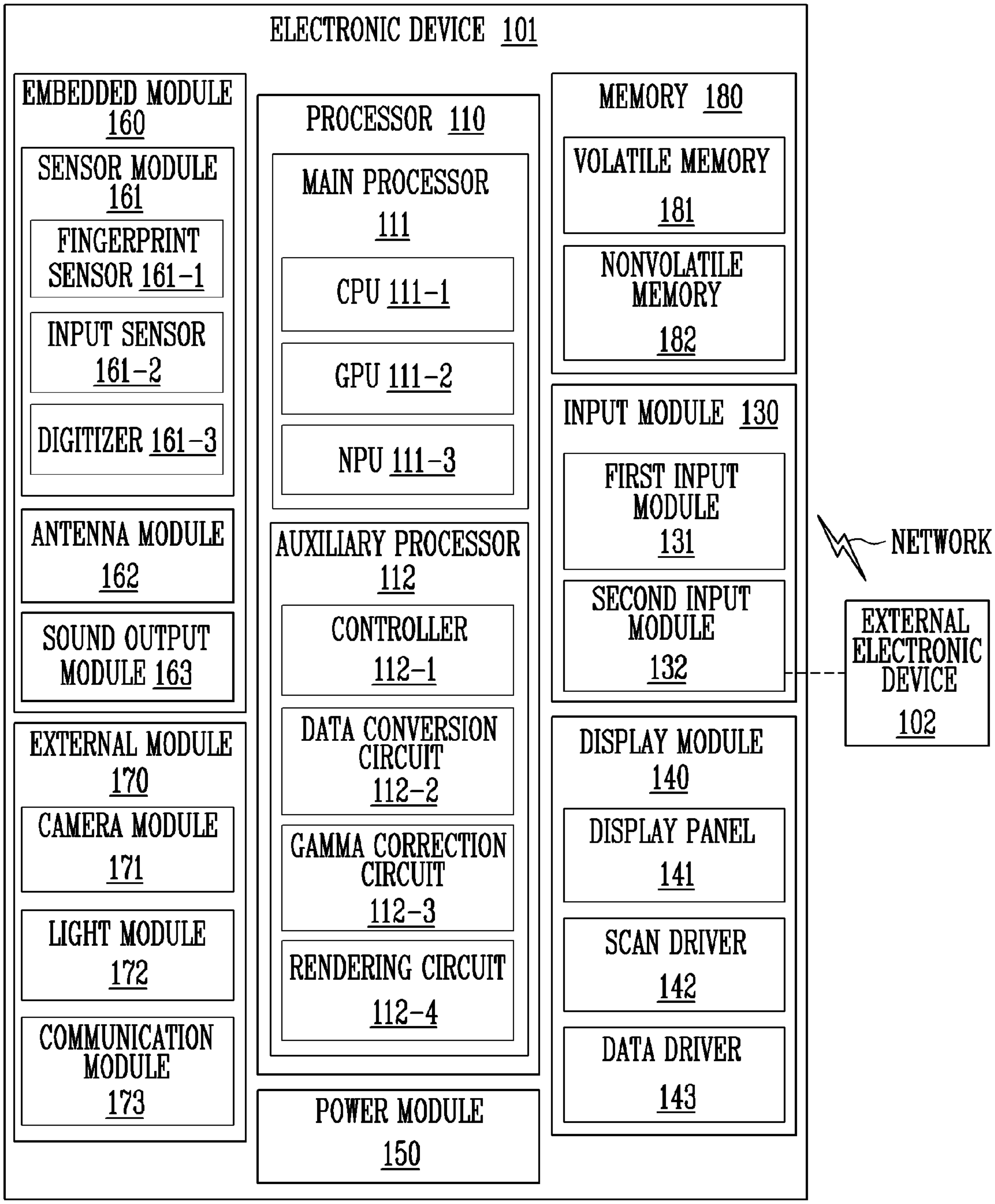
FIG. 13 is a block diagram showing an electronic device in accordance with embodiments of the disclosure.

FIG. 13 is a block diagram of an electronic device 101 in accordance with embodiments of the disclosure.

In an embodiment, the electronic device 101 may output various kinds of information through a display module 140 in an operating system. When a processor 110 executes an application stored in a memory 180, the display module 140 may provide application information to the user through a display panel 141.

The processor 110 may obtain an external input through an input module 130 or a sensor module 161, and execute an application corresponding to the external input. In an embodiment, for example, in a case where the user selects a camera icon displayed on the display panel 141, the processor 110 may obtain a user input through an input sensor 161-2, and activate a camera module 171. The processor 110 may transmit image data corresponding to an image captured by the camera module 171 to the display module 140. The display module 140 may display, on the display panel 141, an image corresponding to the captured image.

In an embodiment, for example, in a case where personal information authentication is executed through the display module 140, a fingerprint sensor 161-1 may obtain inputted fingerprint information as input data. The processor 110 may compare input data obtained through the fingerprint sensor 161-1 with authentication data stored in the memory 180, and may execute an application depending on a result of the comparison. The display module 140 may display, on the display panel 141, information executed according to the logic of the application.

In an embodiment, for example, in a case where a music streaming icon displayed on the display module 140 is selected, the processor 110 may obtain a user input through the input sensor 161-2, and activate a music streaming application stored in the memory 180. If a music playing command is inputted in the music streaming application, the processor 110 may activate a sound output module 163 and provide sound information corresponding to the music playing command to the user.

The operation of the electronic device 101 has been schematically described above. Hereinafter, the configuration of the electronic device 101 will be described in detail. Some of the components of the electronic device 101 to be described below may be integrated into a single component, or one component may be separated into two or more components.

Referring to FIG. 13, an embodiment of the electronic device 101 may communicate with an external electronic device 102 through a network (e.g., a short-range wireless communication network or a long-range wireless communication network). In an embodiment, the electronic device 101 may include a processor 110, a memory 180, an input module 130, a display module 140, a power module 150, an embedded module 160, and an external mounted module 170. In an embodiment of the electronic device 101, at least one of the foregoing components may be omitted, or one or more other components may be added. In an embodiment, some components (e.g., the sensor module 161, an antenna module 162, or a sound output module 163) among the foregoing components may be integrated into another component (e.g., the display module 140).

The processor 110 may execute software to control at least one other component (e.g., a hardware or software component) of the electronic device 101 connected to the processor 110 and perform various data processing or computing operations. In an embodiment, as at least a portion of a data processing or computing operation, the processor 110 may store, in a volatile memory 181, a command or data received from another component (e.g., the input module 130, the sensor module 161, or a communication module 173), process the command or data stored in the volatile memory 181, and store result data in a nonvolatile memory 182.

The processor 110 may include a main processor 111 and an auxiliary processor 112. The main processor 111 may include at least one selected from a central processing unit (CPU) 111-1 and an application processor (AP). The main processor 111 may further include at least one selected from a graphic processing unit (GPU) 111-2, a communication processor (CP), and an image signal processor (ISP). The main processor 111 may further include a neural processing unit (NPU) 111-3. The NPU may be a processor specialized to process an artificial intelligence model. The artificial intelligence model may generated by machine learning. The artificial intelligence model may include a plurality of artificial neural network layers. An artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more among the foregoing networks, but is not limited thereto. The artificial intelligence model may not only include a hardware structure but may also include an additional or substitutive software structure. At least two of the foregoing processing units and the processors may be implemented as a single integrated component (e.g., a single chip). Alternatively, the processing units and the processors may be implemented as respective independent components (e.g., a plurality of chips).

The auxiliary processor 112 may include a controller 112-1. The controller 112-1 may include an interface conversion circuit and a timing control circuit. The controller 112-1 may receive an image signal from the main processor 111, and may convert a data format of the image signal to a format corresponding to specifications of an interface with the display module 140 and output image data. The controller 112-1 may output various control signals needed to drive the display module 140.

The auxiliary processor 112 may further include a data conversion circuit 112-2, a gamma correction circuit 112-3, a rendering circuit 112-4, and the like. The data conversion circuit 112-2 may receive image data from the controller 112-1, compensate for the image data so that an image can be displayed at a desired luminance according to characteristics of the electronic device 101 or settings of the user, or may convert the image data to reduce power consumption or compensate for afterimages. The gamma correction circuit 112-3 may convert image data, a gamma reference voltage, or the like so that an image to be displayed on the electronic device 101 can have desired gamma characteristics. The rendering circuit 112-4 may receive image data from the controller 112-1, and render the image data considering pixel arrangement or the like on the display panel 141 applied to the electronic device 101. At least one selected from the data conversion circuit 112-2, the gamma correction circuit 112-3, and the rendering circuit 112-4 may be integrated into another component (e.g., the main processor 111 or the controller 112-1). At least one selected from the data conversion circuit 112-2, the gamma correction circuit 112-3, and the rendering circuit 112-4 may be integrated into a data driver 143 to be described below.

The memory 180 may store a variety of data to be used in at least one component (e.g., the processor 110 or the sensor module 161) of the electronic device 101, and input data or output data for a command pertaining to the data. The memory 180 may include at least one selected from the volatile memory 181 and the nonvolatile memory 182.

The input module 130 may receive a command or data to be used in a component (e.g., the processor 110, the sensor module 161, or the sound output module 163) of the electronic device 101 from an external device (e.g., the user or an external electronic device 102) provided outside the electronic device 101.

The input module 130 may include a first input module 131 to which a command or data is inputted from the user, and a second input module 132 to which a command or data is inputted from the external electronic device 102. The first input module 131 may include a microphone, a mouse, a keyboard, a key (e.g., a button), or a pen (e.g., a passive pen or an active pen). The second input module 132 may support a designated protocol, which can be connected to the external electronic device 102 in a wired or wireless manner. In an embodiment, the second input module 132 may include a high definition multimedia interface (HDMI), a universal serial bus (USB) interface, a secure digital (SD) card interface, or an audio interface. The second input module 132 may include a connector, e.g., an HDMI connector, a USB connector, an SD card connector, or an audio connector (e.g., a headphone connector), for physical connection with the external electronic device 102.

The display module 140 may provide visual information to the user. The display module 140 may include a display panel 141, a scan driver 142, and a data driver 143. The display module 140 may further include a window, a chassis, and a bracket to protect the display panel 141.

The display panel 141 may include a liquid crystal display panel, an organic light emitting display panel, or an inorganic light emitting display panel. The type of display panel 141 is not limited to a particular type. The display panel 141 is a rigid type panel, or a flexible type panel, which is rollable or foldable. The display module 140 may further include a support, a bracket, or a heat dissipater, which may support the display panel 141.

The scan driver 142 may be mounted on the display panel 141 as a driving chip. The scan driver 142 may be integrated on the display panel 141. In an embodiment, for example, the scan driver 142 may include an amorphous silicon TFT gate driver circuit, a LTPS TFT gate driver circuit, or an oxide semiconductor TFT gate driver circuit, which is included or integrally formed in the display panel 141. The scan driver 142 may receive a control signal from the controller 112-1, and output scan signals to the display panel 141 in response to the control signal.

The display panel 141 may further include an emission driver. The emission driver may output an emission control signal to the display panel 141 in response to a control signal received from the controller 112-1. The emission driver may be formed separately from the scan driver 142, or may be integrated into the scan driver 142.

The data driver 143 may receive a control signal from the controller 112-1, convert image data to an analog voltage (e.g., a data voltage) in response to the control signal, and output data voltages to the display panel 141.

The data driver 143 may be integrated into another component (e.g., the controller 112-1). The functions of the interface conversion circuit and the timing control circuit of the controller 112-1 may be integrated into the data driver 143.

The display module 140 may further include an emission driver, a voltage generation circuit, and the like. The voltage generation circuit may output various voltages needed to drive the display panel 141.

The power module 150 may supply power to the components of the electronic device 101. The power module 150 may include a battery to store power voltage. The battery may include a primary cell, which cannot be recharged, and a secondary cell or a fuel cell, which are rechargeable. The power module 150 may include a PMIC. The PMIC may supply optimized power to each of the foregoing modules and modules to be described below. The power module 150 may include a wireless power transceiver that is electrically connected with the battery. The wireless power transceiver may include a plurality of coiled antenna radiators.

The electronic device 101 may further include an embedded module 160 and an external mounted module 170. The embedded module 160 may include a sensor module 161, an antenna module 162, and a sound output module 163. The external mounted module 170 may include a camera module 171, a light module 172, and a communication module 173.

The sensor module 161 may sense an input from the body of the user or an input from a pen of the first input module 131, and generate an electric signal or a data value corresponding to the input. The sensor module 161 may include at least one or more of a fingerprint sensor 161-1, an input sensor 161-2, and a digitizer 161-3.

The fingerprint sensor 161-1 may generate a data value corresponding to the fingerprint of the user. The fingerprint sensor 161-1 may include any one of an optical fingerprint sensor and a capacitive fingerprint sensor.

The input sensor 161-2 may generate a data value corresponding to coordinate information of an input from the body of the user or an input from the pen. The input sensor 161-2 may generate a data value corresponding to the amount of change in capacitance by the input. The input sensor 161-2 may sense an input from a passive pen, or transmit or receive data to or from an active pen.

The input sensor 161-2 may measure a biometric signal pertaining to biometric information such as a blood pressure, body fluid, or body fat. In an embodiment, for example, in a case where the user brings a part of his/her body into contact with the sensor layer or the sensing panel and remains stationary for a certain time, the input sensor 161-2 may sense a biometric signal, based on a change in electric field by the part of his/her body, and output information desired by the user to the display module 140.

The digitizer 161-3 may generate a data value corresponding to coordinate information of an input from a pen. The digitizer 161-3 may generate a data value corresponding to the amount of change in magnetic flux by the input. The digitizer 161-3 may sense an input from a passive pen, or transmit or receive data to or from an active pen.

At least one selected from the fingerprint sensor 161-1, the input sensor 161-2, and the digitizer 161-3 may be implemented as a sensor layer formed on the display panel 141 through a successive process. The fingerprint sensor 161-1, the input sensor 161-2, and the digitizer 161-3 may be disposed over the display panel 141. Any one selected from the fingerprint sensor 161-1, the input sensor 161-2, and the digitizer 161-3, for example, the digitizer 161-3, may be disposed under the display panel 141.

At least two or more selected from the fingerprint sensor 161-1, the input sensor 161-2, and the digitizer 161-3 may be formed to be integrated into a single sensing panel through the same process. In an embodiment where at least two or more of the fingerprint sensor 161-1, the input sensor 161-2, and the digitizer 161-3 are integrated into a single sensing panel, the sensing panel may be disposed between the display panel 141 and a window disposed over the display panel 141. In an embodiment, the sensing panel may be disposed on the window, and the position of the sensing panel is not particularly limited.

At least one selected from the fingerprint sensor 161-1, the input sensor 161-2, and the digitizer 161-3 may be embedded in the display panel 141. In other words, during a process of forming components (e.g., a light emitting element, a transistor, and the like) included in the display panel 141, at least one of the fingerprint sensor 161-1, the input sensor 161-2, and the digitizer 161-3 may be formed simultaneously with the components.

In addition, the sensor module 161 may generate an electrical signal or data value corresponding to internal conditions or external conditions of the electronic device 101. The sensor module 161 may further include, for example, a gesture sensor, a gyroscope sensor, an atmospheric sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 162 may include one or more antennas to transmit or receive a signal or power to or from an external device. In an embodiment, the communication module 173 may transmit a signal to an external electronic device or receive a signal from the external electronic device through an antenna suitable for a communication scheme. An antenna pattern of the antenna module 162 may be integrated to a component of the display module 140 (e.g., the display panel 141 of the display module 140) or the input sensor 161-2.

The sound output module 163 may be a device for outputting a sound signal to a device provided outside the electronic device 101, and, for example, may include a speaker, which is used for typical purposes such as reproducing multimedia or record data, and a receiver, which is used only for phone reception. In an embodiment, the receiver may be integrally or separately formed with a speaker. A sound output pattern of the sound output module 163 may be integrated into the display module 140.

The camera module 171 may capture a static image or a video. In an embodiment, the camera module 171 may include one or more lenses, an image sensor, or an image signal processor. The camera module 171 may further include an infrared camera capable of sensing the presence of the user, the position of the user, a line of sight of the user, etc.

The light module 172 may provide light. The light module 172 may include a light emitting diode or a xenon lamp. The light module 172 may be operated interlocking with the camera module 171 or operated independently therefrom.

The communication module 173 may form a wire or wireless communication channel between the electronic device 101 and the external electronic device 102, and support execution of communication through the formed communication channel. The communication module 173 may include either or both a wireless communication module such as a cellular communication module, a short-range wireless communication module, or a global navigation satellite system (GNSS) communication module, and a wire communication module such as a local area network (LAN) communication module, or a power line communication module. The communication module 173 may communicate with the external electronic device 102 through a short-range communication network such as Bluetooth, WiFi Direct or infrared data association (IrDA), or a long-range communication network such as a cellular network, an internet, or a computer network (e.g., LAN or WAN). The foregoing various types of communication modules 173 may be implemented as a single chip or may be implemented as respective separate chips.

The input module 130, the sensor module 161, the camera module 171, and the like, interlocking with the processor 110, may be used to control the operation of the display module 140.

The processor 110 may output a command or data to the display module 140, the sound output module 163, the camera module 171, or the light module 172, based on input data received from the input module 130. In an embodiment, for example, the processor 110 may generate image data in response to input data applied through a mouse, an active pen, or the like and output the image data to the display module 140, or may generate command data in response to input data and output the command data to the camera module 171 or the light module 172. In the case where input data is not received from the input module 130 for a certain time, the processor 110 may convert the operation mode of the electronic device 101 to a low-power mode or a sleep mode so that power consumption of the electronic device 101 can be reduced.

The processor 110 may output a command or data to the display module 140, the sound output module 163, the camera module 171, or the light module 172, based on sensing data received from the sensor module 161. In an embodiment, for example, the processor 110 may compare authentication data applied from the fingerprint sensor 161-1 with the authentication data stored in the memory 180, and may execute an application depending on a result of the comparison. The processor 110 may execute a command based on sensing data sensed by the input sensor 161-2 or the digitizer 161-3, or output corresponding image data to the display module 140. In an embodiment where the sensor module 161 includes a temperature sensor, the processor 110 may receive temperature data for a measured temperature from the sensor module 161, and further execute a luminance correction operation for the image data based on the temperature data.

The processor 110 may receive measurement data for the presence of the user, the position of the user, a line of sight of the user, or the like from the camera module 171. The processor 110 may further execute a luminance correction operation for the image data based on the measurement data. In an embodiment, for example, the processor 110 that has determined whether the user is through an input from the camera module 171 may output, to the display module 140, image data the luminance of which is corrected by the data conversion circuit 112-2 or the gamma correction circuit 112-3.

Some components among the foregoing components may be connected to each other by a communication scheme, e.g., a bus, general purpose input/output (GPIO), a serial peripheral interface (SPI), a mobile industry processor interface (MIPI), or an ultra path interconnect (UPI) link, which can be used between peripheral devices, and may thus exchange a signal (e.g., a command or data) therebetween. The processor 110 may communicate with the display module 140 through an agreed interface. In an embodiment, for example, any one of the foregoing communication schemes may be used, and the interface is not limited to the foregoing communication schemes.

The electronic device 101 in accordance with various embodiments may correspond to various types of devices.

The electronic device 101 may include, for example, at least one of a potable telecommunication device (e.g., a smart phone), a computer, a portable multimedia device, a portable medical device, a camera, wearable device, or a home appliance. The electronic device 101 in accordance with an embodiment of the disclosure is not limited to the foregoing devices.

In a display device and a method of driving the display device in accordance with the disclosure, there are various display modes distinguished from each other so that a short-circuit test can be prevented from being performed in undesired cases.

In a display device and a method of driving the display device in accordance with the disclosure, even if the magnitude of a first power voltage is relatively small, a short-circuit testing function can be reliably performed.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

pixels, each of which is connected to a first power line and a second power line; and a power supply which, in a first display mode, supplies a first power voltage to the first power line and supplies a second power voltage to the second power line, wherein the power supply comprises:

a first power supply which generates the first power voltage;

a second power supply which generates the second power voltage; and a shut-down determiner which shuts down the first power supply and the second power supply in a case where the first power voltage is greater than a first reference voltage at a first time point, and the second power voltage is greater than a second reference voltage at a second time point.

2. The display device according to claim 1, wherein the second time point is after the first time point, and wherein an interval between the first time point and the second time point is shorter than one frame period.

3. The display device according to claim 2, wherein the second reference voltage is greater than the first reference voltage.

4. The display device according to claim 3, wherein the first reference voltage is less than a ground voltage, and wherein the second reference voltage is greater than the ground voltage.

5. The display device according to claim 3, further comprising:

a data driver which, in a second display mode, supplies the first power voltage to the first power line and supplies the second power voltage to the second power line, wherein the second power voltage in the second display mode is greater than the second power voltage in the first display mode.

6. The display device according to claim 1, wherein the power supply further comprises:

a discharge transistor connected to the second power line; and a discharge resistor connected to the discharge transistor.

7. The display device according to claim 6, wherein the power supply further comprises:

a first comparator including a first input terminal connected to the second power line, and a second input terminal which receives the first reference voltage;

a first gate including a first input terminal connected to an output terminal of the first comparator, and a second input terminal; and a second gate including a first input terminal which receives a short-circuit detection setting signal, and a second input terminal connected to the output terminal of the first gate.

8. The display device according to claim 7, wherein the first gate is an OR gate, and wherein the second gate is an AND gate.

9. The display device according to claim 7, wherein the power supply further comprises:

a calculator which computes the second reference voltage based on a first power voltage setting value; and a second comparator including a first input terminal connected to the second power line, and a second input terminal which receives the second reference voltage.

10. The display device according to claim 9, wherein the shut-down determiner determines whether to shut down the first power supply and the second power supply, based on an output logic signal of the second gate and an output logic signal of the second comparator.

11. A method of driving a display device including: pixels each of which is connected to a first power line and a second power line; and a power supply which, in a first display mode, supplies a first power voltage to the first power line and supplies a second power voltage to the second power line, the method comprising:

changing a power control signal from a first logic level to a second logic level;

detecting a magnitude of the second power voltage;

checking whether the second power voltage is greater than a first reference voltage at a first time point;

checking whether the second power voltage is greater than a second reference voltage at a second time point after the first time point in a case where the second power voltage is greater than the first reference voltage at the first time point;

and shutting down a first power supply and a second power supply of the power supply in a case where the second power voltage is greater than the second reference voltage at the second time point, wherein the first power supply generates the first power voltage, and the second power supply generates the second power voltage.

12. The method according to claim 11, wherein the second time point is after the first time point, and wherein an interval between the first time point and the second time point is shorter than one frame period.

13. The method according to claim 12, wherein the second reference voltage is greater than the first reference voltage.

14. The method according to claim 13, wherein the first reference voltage is less than a ground voltage, and wherein the second reference voltage is greater than the ground voltage.

15. The method according to claim 13, wherein the display device further includes a data driver which, in a second display mode, supplies the first power voltage to the first power line and supplies the second power voltage to the second power line, and wherein the second power voltage in the second display mode is greater than the second power voltage in the first display mode.

16. The method according to claim 11, wherein the power supply comprises:

a discharge transistor connected to the second power line; and a discharge resistor connected to the discharge transistor.

17. The method according to claim 16, wherein the power supply further comprises:

a first comparator including a first input terminal connected to the second power line, and a second input terminal which receives the first reference voltage;

a first gate including a first input terminal connected to an output terminal of the first comparator, and a second input terminal; and a second gate including a first input terminal which receives a short-circuit detection setting signal, and a second input terminal connected to the output terminal of the first gate.

18. The method according to claim 17, wherein the first gate is an OR gate, and wherein the second gate is an AND gate.

19. The method according to claim 17, wherein the power supply further comprises:

a calculator which computes the second reference voltage based on a first power voltage setting value; and a second comparator including a first input terminal connected to the second power line, and a second input terminal which receives the second reference voltage.

20. The method according to claim 19, wherein the power supply further comprises a shut-down determiner which determines whether to shut down the first power supply and the second power supply, based on an output logic signal of the second gate and an output logic signal of the second comparator.

* * * * *